United States Patent [19]
Maruyama et al.

[11] Patent Number: 5,973,320
[45] Date of Patent: Oct. 26, 1999

[54] OPTICAL POSITION SENSOR

[75] Inventors: Toshiki Maruyama; Akira Akahane; Hideo Asawa, all of Nagano-ken, Japan

[73] Assignee: Harmonic Drive Systems, Inc., Tokyo, Japan

[21] Appl. No.: 08/988,535

[22] Filed: Dec. 10, 1997

[30] Foreign Application Priority Data

Dec. 25, 1996 [JP] Japan .................................. 8-345128

[51] Int. Cl.$^6$ ............................................. G01D 5/34
[52] U.S. Cl. .............................. 250/231.13; 250/231.18; 250/214 PR
[58] Field of Search ................ 250/231.13, 231.14, 250/231.18, 214 C, 214 PR; 356/141.4, 141.5

[56] References Cited

U.S. PATENT DOCUMENTS

| | | | |
|---|---|---|---|
| 4,692,613 | 9/1987 | Masuda et al. | 250/231.13 |
| 5,132,531 | 7/1992 | Duncan et al. | 250/231.13 |
| 5,136,154 | 8/1992 | Carangelo et al. | 250/214 L |
| 5,272,335 | 12/1993 | Nakaho | 250/231.13 |
| 5,352,968 | 10/1994 | Reni et al. | 320/35 |
| 5,537,874 | 7/1996 | Akahane et al. | 73/514.04 |

*Primary Examiner*—Edward P. Westin
*Assistant Examiner*—Thanh X. Luu
*Attorney, Agent, or Firm*—Burns, Doane, Swecker & Mathis

[57] ABSTRACT

An optical position sensor comprises a linearity correction circuit 20 having ROM 22 in which a corresponding table between compensation values and respective rotational angular position of a rotational disk 51. The compensation values are obtained such that an actual relationship is measured between the rotational angular positions of the rotational disk 51 and the output B of a semiconductor position sensing device 54, deviation of the output B of the device 54 from a predetermined linearity relationship (A) is calculated, and compensation values are determined for eliminating the deviation of the output B of the device 54 at respective rotational angular positions of the rotational disk 51. The linearity correction circuit 20 retrieves a compensation value E from ROM 22 based on the output B of the device 54, and compensates the output A so as to produce the sensing output E which has a linearity relationship to the rotational angle of the rotational disk 51.

2 Claims, 3 Drawing Sheets

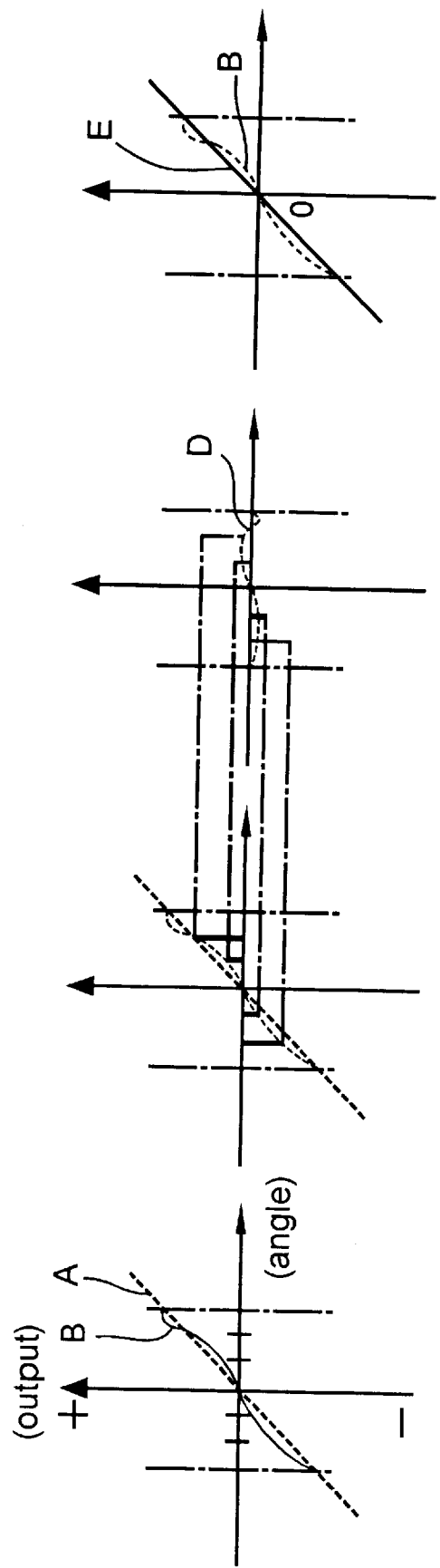

OPTICAL POSITION SENSOR

BACKGROUND OF THE INVENTION

1. Field of the Invention

The present Invention relates to an optical position sensor for detecting a rotational position of a finite rotational type motor and the like. In particular, the present invention pertains to an optical position sensor that comprises a light emitting means, a light receiving means and a rotational disk positioned between the light emitting and receiving means and formed with a spiral slit, wherein a rotational angle of the rotational disk is detected in accordance with a position on the light receiving means where a light passing through the slit is received.

2. Related Art Description

The inventors of the present patent application propose a finite rotational type motor capable of high accurate light scanning In U.S. Pat. No. 5,537,874 issued on Jul. 23, 1996 and assigned to the same assignee of the present Invention. FIG. 1A shows a basic structure of this type of finite rotational motor. The finite rotational type motor 1 has an annular stator yoke 3 and a columnar rotor 2 of permanent magnet arranged coaxially inside the stator yoke 3. The stator yoke 3 is formed on it's inner circumferential surface with a pair of salient poles 3a and 3b. The torque generating mechanism of the finite rotational type motor 1 is generally the some as the respective one-phase portions of that of a typical brushles DC motor. The finite rotational type motor 1 is also provided with grooves 3c and 3d formed on end surfaces of the salient poles 3a, 3b, respectively, whereby the rotor 2 can be maintained at its initial position where the magnetic-pole direction of the rotor 2 is perpendicular to that of the stator 3. The operational angular range of the finite rotational type motor 1 is approximately between −15 and +15 degrees with respect to the initial position of the rotor 2, and an output shaft 4 connected coaxially with the rotor 2 is connected with a driven member such as a light scanning mirror and the like. The output shaft 4 of the motor 1 is provided on its opposite end with a position sensor 5 for detecting a finite rotational angular position thereof.

The position sensor 5 is an optical potentiometer which generates an analog signal in proportion to a rotational angle of the motor output shaft 4, and is provided with a rotational disk 51 fixedly connected to the motor output shaft 4. The rotational disk 51 is formed therein with a spiral slit 52 extending between an angular range which encompasses the finite rotational angular range of the motor output shaft 4. With respect to the portion of the disk 51 where the slit 52 is formed, a light emitting element 53 is arranged at one side, while a light receiving element 54 at the other side in a manner facing with each other. The light receiving element 54 is a one-dimensional semiconductor position sensing device (PSD) whose light receiving surface is arrange in the radial direction of the disk 51 for detecting a radial position of light passing through the slit, or the optical center thereof.

As shown in FIG. 1B, the curve of the slit 52 of the rotational disk 51 is defined by the following polar-coordinate expression.

$$r = r_0 + k\theta$$

wherein k is a constant

A part of the light from the light emitting element 53 passes through the slit 52 of the disk 51 to reach the semiconductor position sensing device 54, whereby the rotational angle θ of the rotational disk 51 is converted into a radial position r of the light on the light receiving surface (PSD sensing area) 54a of the semiconductor position sensing device 54, the angle θ being in proportion to the position r.

The output currents of both ends of the semiconductor position sensing device 54 varies in an inversely proportional relationship with each other in accordance with the position r of the light on the light receiving surface 54a of the device 54. More specifically, provided that the output currents from the both ends of the device 54 be ia and ib, and that the length of the light receiving surface of the device 54 be L, the position r of the light on the light receiving surface of the device 54 is defined by the following expression.

$$R = (L/2)(ia-ib)/(ia+ib)$$

Thus, an output (ia−ib) can be set in proportion to the positional information r of the light by controlling the amount of light emission of the light emitting element 53 so that the current value (ia+ib) corresponding to the light energy received by the device 54 is maintained constent.

The thus constituted optical position sensor 5 must have a high linearity characteristic in which an output is accurately proportional to the rotational angle of the rotational disk 51. This linearity of the sensor 5 is adversely affected by the linearity characteristic of the device itself, accuracy of slit pattern of the rotational disk 51, assembly error of components parts, light distribution characteristics of the light emitting element 53 or the like. Hence, if error components included in the output of the sensor 5 due to these parameters are not eliminated from the output, an accurate rotational angle sensing operation of the sensor 5 cannot be guaranteed.

SUMMARY OF THE INVENTION

Accordingly, an object of the present invention is to provide an optical position sensor which is able to generate a sensing output having a high linearity.

In order to realize the above and other objects, according to the present invention, there is provided an optical position sensor which comprises a light emitting means, a light receiving means, and a rotational disk arranged between the light emitting and receiving means and formed with a spiral slit, wherein a position on a light receiving surface of the light receiving means where a light passed through the slit is received is shifted in a radial direction of the rotational disk in responsive of a rotational angle of the rotational disk, thereby generating a sensing output corresponding to the rotational angle of the rotational disk; characterized in that it has a linearity correction circuit for compensating an output from the light receiving means so as to establish a linearity relationship between the sensing output and the rotational angle of the rotational disk, the linearity correction circuit has a memory means for storing a corresponding table in which compensation values are assigned to respective rotational angle positions of the rotational disk and for generating one of the compensation values in responsive of the output from the light receiving means, and the compensation values are obtained by measuring an actual relationship between the rotational angle of the rotational disk and the output of the light receiving means, calculating deviation of the output of the light receiving means from a predetermined linearity relationship between the rotational angle of the rotational disk and the output of the light receiving means, and determining compensation values for eliminating the deviation of the output of the light receiving means at respective rotational angle positions of the rotational disk, wherein the linearity correction circuit retrieves a compensation value from the memory means based on the output of the light receiving means, and compensates the output of the light receiving means so as to produce the sensing output which has a linearity relationship to the rotational angle of the rotational disk.

The light receiving means may be a semiconductor position sensing device in which output currents appeared on both ends of the device varies in an inversely proportional relationship with each other in accordance with a light receiving position of the light receiving surface of the device arranged in a radial direction of the rotational disk.

According to the optical position sensor as constituted above, the compensation values which ore obtained based on the actually measured deviation of the output are stored beforehand, and the actual output is compensated by using the respective compensation values, whereby there is obtained a sensing output which has an excellent linearity relationship with the rotational angle of the disk. As a result, provision of the optical position sensor of the present invention can realize a highly accurate operation of controlling the rotational angle of a driven member.

BRIEF DESCRIPTION OF THE DRAWINGS

FIGS. 2B to 2E are graphs showing operations of respective portions of the control system of the optical position sensor of FIG. 2A.

DETAILED DESCRIPTION OF PREFERRED EMBODIMENT

Figure 1A:
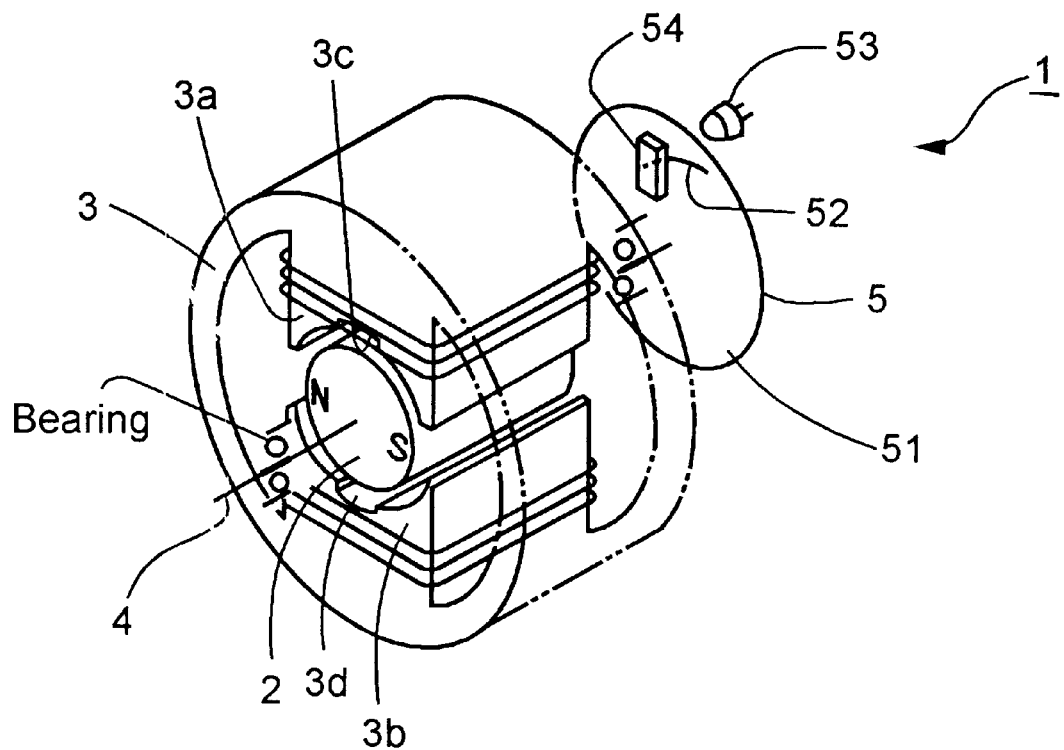
FIG. 1A is a schematic diagram showing a finite rotational type motor provided with an optical position sensor to which the present invention can be applied.

Referring now to the drawings, an example of the present invention will be explained.

Figure 1B:
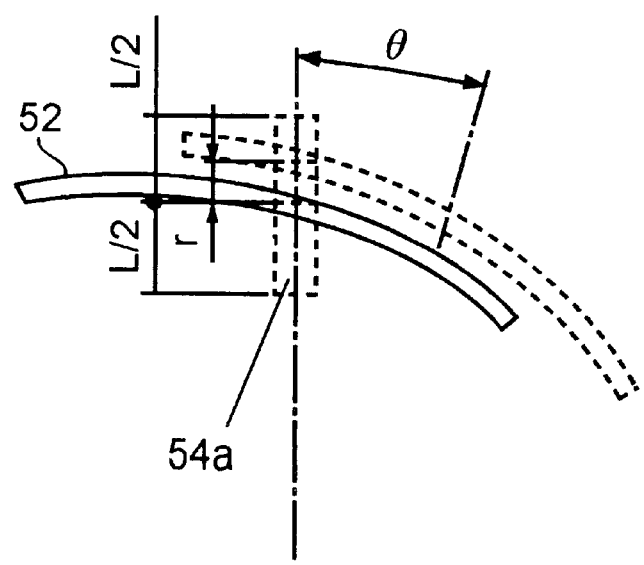
FIG. 1B is an illustration of a slit formed in a rotational disk of the optical position sensor of FIG. 1A.
Figure 2A:
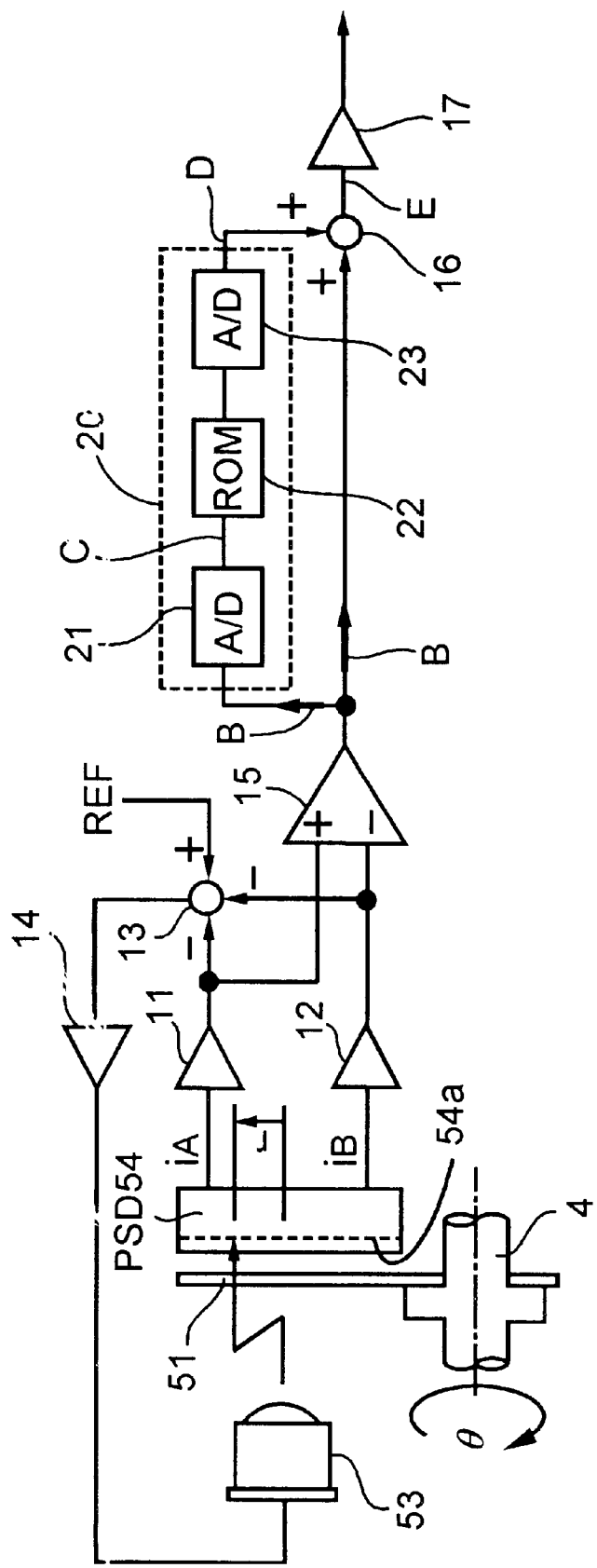
FIG. 2A is a schematic block diagram showing a control system of an optical position sensor according to the present invention.

FIG. 2A is a schematic block diagram of an optical position sensor. Since the general structure of the optical position sensor of the example is the same as that of the optical position sensor 1 as shown in FIGS. 1A and 1B, corresponding elements of this example are denoted by the same reference numerals and explanation of these elements are omitted here in this specification for clarity. In addition, the content of the above-mentioned U.S. Pat. No. 5,537,874 is incorporated herein by reference.

As shown in this figure, a semiconductor position sensing device 64 generates output currents ia and ib from its both ends, which in turn are amplified by amplifiers 11 and 12, respectively and are supplied to an adder 13 wherein these amplified currents are added together and compared with a reference current REF so as to obtain a difference between them. The value of the difference is amplified through an amplifier 14 and then fed back to a drive current for a light emitting element 53. Whereby, an amount of light received by the semiconductor position sensing device 54 is controlled to be an constant value. Namely, the sum of the current values (ia+ib) is controlled to be constant, On the other hand, a difference in value between the currents ia and ib is obtained by a comparator 15. In an ideal condition, the difference is in a linearity relationship with the rotational angle of the rotational disk 51 as shown by straight line A of FIG. 2B. In actual conditions, however, this linearity characteristic is deteriorated due to the linearity of the device 54 itself, pattern accuracy of the slit 52 of the rotational disk 51, assembly errors of the respective component parts 51, 52, 53, light distribution characteristics of the light emitting element 53 or the like, so that the relationship of the difference in value between the currents ia and ib with respect to the rotational angle of the rotational disk becomes a non-linear curve B as shown in FIG. 2B, for example. According to the present example, there is provided a linearity correction circuit 20 for eliminating such errors which are deviation of the curve B from the straight line A at respective rotational angles.

As shown in FIG. 2A, the linearity correction circuit 20 includes an A/D converter 21 for converting analog output signal B of the comparator 15 into digital signal, a ROM 22 for generating a compensation value in responsive of digital signal C, and a D/A converter 23 for converting the digital compensation value into an analog signal D. AID converter 21 converts the analog output signal B into a digital value as shown in FIG. 2C. ROM 22 stores therein compensation values for respective rotational angular positions of the rotational disk 51 in the form of the corresponding table.

The compensation values are those that were obtained as follows. First, actual analog output signal B was measured by rotating the rotational disk 51. Then, deviation of the signal B from a linearity line A was calculated. The desired linearity line A represents a desired or predetermined linearity relationship between the analog output signal B and the rotational angle of the rotational disk 51. Next, a compensation value was obtained for eliminating deviation from the linearity line A at each rotational angular position, so that the corresponding table was prepared in which respective compensation values are assigned to corresponding rotational angular positions. The obtained corresponding table are installed in ROM beforehand.

According to this example, when the digital signal C corresponding to the analog signal B is supplied to ROM 22, a compensation value which is assigned to the rotational angular position corresponding to the digital signal C is retrieved and generated from ROM 22. This digital compensation value is converted into an analog signal D by D/A converter 23. That is the digital value shown in the form of a bar graph in FIG. 2D is converted into a analog signal D shown by a curve in the same drawing. The compensation value in the form of analog signal is added to the analog output signal B from the comparator 15. As a result, there is produced a sensing output signal E which exhibits an excellent linearity with respect to the rotational angle of the rotational disk 51. In FIG. 2E, the signal E is represented by a straight line, while the actual sensing signal B by a dotted line. The thus obtained sensing output signal E is amplified and output via the amplifier 17.

As mentioned above, according to the optical position sensor of the present invention, the actual sensing output thereof is measured with respect to the rotational angle, based on which the compensation values are obtained for compensating the actual sensing output so as to assure linearity (proportionality) between the rotational angle and the sensing output, and in operation the actual sensing output is compensated by the compensation value assigned to the rotational angular position corresponding to the actual sensing output, Hence, according to the present invention, the sensing output which has an excellent linearity with respect to the rotational angle, or accurate sensing output can be obtained.

What is claimed is:

1. An optical position sensor which comprises:

a light emitting means, a light receiving means, and a rotational disk arranged between the light emitting and light receiving means and formed with a spiral slit encompassing a prescribed angular range, wherein a light emitted from the light emitting means and passed through the spiral slit is received by a light receiving surface of the light receiving means, a position where the light is received on the light receiving surface moves in a radial direction of the rotational disk in accordance with a rotational angle of the rotational disk, thereby producing a sensing output corresponding to the rotational angle of the rotational disk;

a linearity correction circuit for compensating an output from the light receiving means so as to establish a linearity relationship between the sensing output and the rotational angle of the rotational disk;

the linearity correction circuit has a memory means for storing a corresponding table in which compensation values are assigned to respective rotational angular positions of the rotational disk and for generating one of the compensation values in response to the output from the light receiving means; and the compensation values are obtained by measuring an actual relationship between the rotational angle of the rotational disk and the output of the light receiving means, calculating deviation of the output of the light receiving means from a predetermined linearity relationship between the rotational angle of the rotational disk and the output of the light receiving means, and determining compensation values for eliminating the deviation of the output of the light receiving means at respective rotational angular positions of the rotational disk, wherein the linearity correction circuit retrieves a compensation value from the memory means based on the output of the light receiving means, and compensates the output of the light receiving means so as to produce the sensing output which has a linearity relationship to the rotational angle of the rotational disk.

2. An optical position sensor according to claim 1, wherein the light receiving means comprises a semiconductor position sensing device which has a light receiving surface arranged in a radial direction of the rotational disk, output current signals from both ends of which varies in an inversely proportional relationship with each other in responsive of a light receiving position on the light receiving surface.

* * * * *